United States Patent
Singer

(10) Patent No.: US 6,851,714 B2
(45) Date of Patent: Feb. 8, 2005

(54) SEAT BELT CLOSURE-SECUREMENT ARRANGEMENT WITH INTEGRATED FORCE EVALUATION

(75) Inventor: Klaus-Peter Singer, Hamburg (DE)

(73) Assignee: Autoliv Development AB, Vargarda (SE)

( * ) Notice: Subject to any disclaimer, the term of this patent is extended or adjusted under 35 U.S.C. 154(b) by 32 days.

(21) Appl. No.: 10/319,761

(22) Filed: Dec. 13, 2002

(65) Prior Publication Data

US 2003/0116954 A1 Jun. 26, 2003

(30) Foreign Application Priority Data

Dec. 22, 2001 (DE) .......................................... 101 63 917

(51) Int. Cl.[7] .............................................. B60R 22/00
(52) U.S. Cl. .................................................. 280/801.1
(58) Field of Search .............................. 280/801.1, 808; 297/468, 482

(56) References Cited

U.S. PATENT DOCUMENTS 3,644,967 A * 2/1972 Romanzi et al. .............. 24/642
4,618,164 A * 10/1986 Ryu ............................. 280/804

FOREIGN PATENT DOCUMENTS

WO    WO 98/51546    11/1998

* cited by examiner

Primary Examiner—Faye M. Fleming
(74) Attorney, Agent, or Firm—R W Becker & Associates; R W Becker

(57) ABSTRACT

A securement arrangement for a seat belt closure of a three-point seat belt system in a vehicle comprises an anchor piece secured to the vehicle, a closure body, and a generally U-shaped closure body retaining assembly for mounting the closure body on the anchor piece. A spring disposed between a pair of U-forming legs of the closure body retaining assembly biases the closure body into its home position. A contact element emits a signal to be processed by an onboard signal processing unit when the closure body, due to the application thereto of a load imposed by the seat belt, is displaced so as to overcome the biasing force of the spring. The contact element correspondingly moves out of contact and emits a signal in response to its movement out of contact.

21 Claims, 7 Drawing Sheets

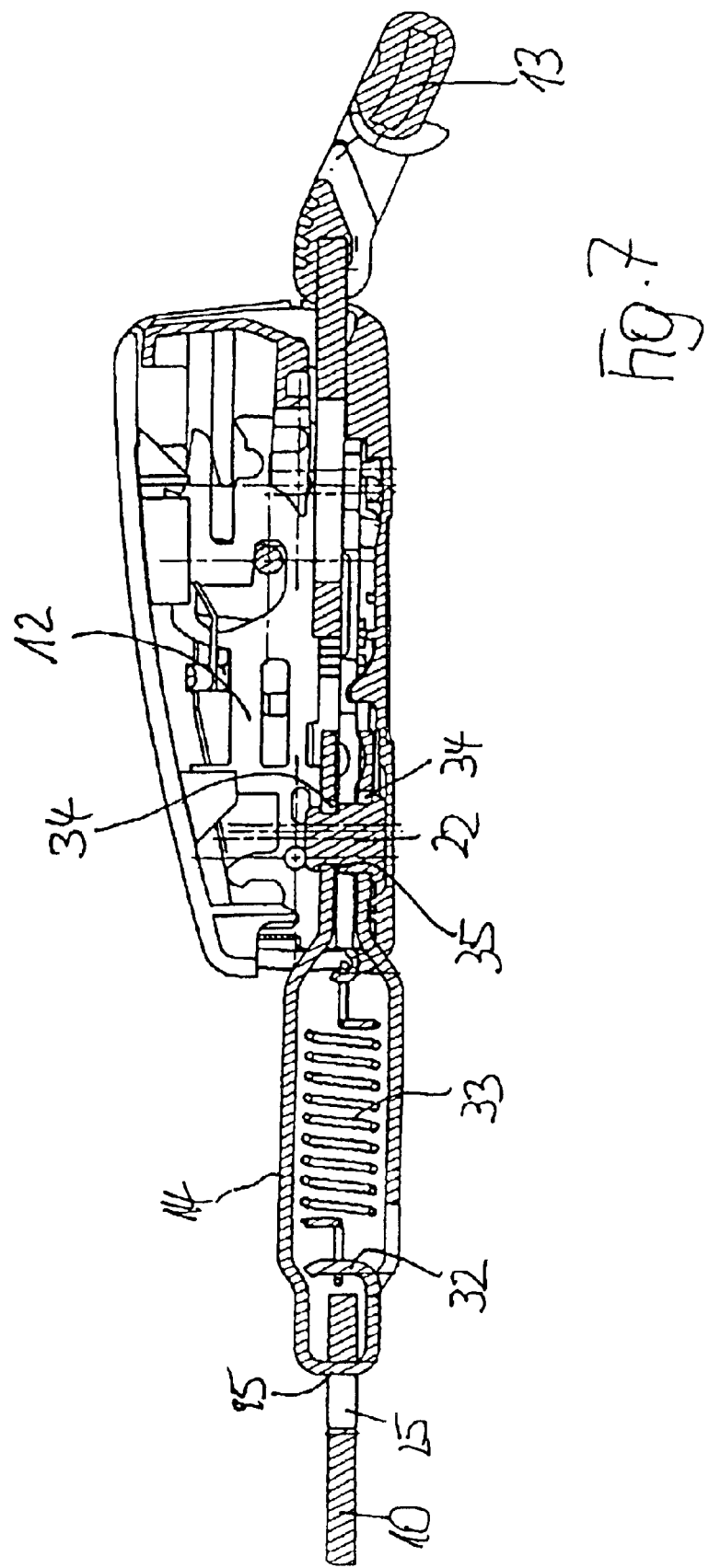

SEAT BELT CLOSURE-SECUREMENT ARRANGEMENT WITH INTEGRATED FORCE EVALUATION

BACKGROUND OF THE INVENTION

The invention relates to a securement arrangement for the seat belt closure of a three-point seat belt system of a vehicle with a vehicle-secured closure body retaining assembly for mounted support of the closure body.

In connection with three-point seat belt systems, in the context of which the use of a securement arrangement for the seat belt closure is known, the problem occurs in connection with a locked-together seat belt that it must be determined, via appropriate measurements, whether, for example, a vehicle occupant has secured the seat belt or a child seat has been secured to the vehicle seat by means of the seat belt, because the decision to deploy or not deploy an airbag dedicated to the respective vehicle seat will be made dependent upon such information. This problem is addressed in WO 98/51546 and, in this publication, a solution to this problem is indicated in which, in connection with a high tension in the belt as correspondingly occurs in the event of an accident involving an occupant secured in the vehicle by the seat belt, a belt closure is displaced against the bias of a spring and thereby effects the release of a switch which transmits an electrical signal to a control device mounted on the vehicle. Further details in WO 98/51546 for the realization of such a proposed solution are not to be found.

Furthermore, U.S. Pat. No. 6,209,915 as well as DE 199 48 666 C1 each disclose force measurement devices disposed on securement arrangements for seat belt closures in vehicles which are configured such that the force sensors on the seat belt closure anchorage provide a signal to an evaluation unit or a control unit, which corresponds with other security-related devices in the vehicle.

SUMMARY OF THE INVENTION

The invention provides a solution to the challenge of providing a constructive configuration of a displaceably arranged closure with integrated force measurement.

The solution to the challenge is embodied in the advantageous embodiments of the invention.

The invention provides, in one embodiment thereof, that the closure body retaining assembly is configured as a U-shaped body and the closure body is displaceable in opposition to its vehicle-secured anchorage against the force of a spring, which biases the closure body into its home position and which is disposed between the U-forming legs of the closure body retaining assembly, the closure body, due to the displacement thereof caused by the load imposed thereon, effecting, via switching of a contact, the emission of a signal to a signal processing device on the vehicle. The invention comprises, in one embodiment thereof, the feature that the vehicle-secured anchorage for the closure body retaining assembly is configured as an anchor piece secured to a vehicle-secured component. In this manner, three components are available for the constructive realization of the inventive concept-namely, the closure body, the closure body retaining assembly, and, as may be optionally provided, the anchor piece or, respectively, the fastening of the closure body retaining element on the vehicle piece.

In one embodiment of the invention, it is provided that the closure body is movable relative to the closure body retaining assembly against the bias of the vehicle-secured anchor and the contact is configured, on the one hand, on the vehicle-secured anchor and, on the other hand, on the switch elements mounted on the closure body retaining assembly.

In accordance with an embodiment of the invention for realization of the afore-described concepts, a fastening stone having a fastening means extending therethrough and a spring for biasing the closure body retaining assembly against the fastening stone are disposed between the U-forming legs of the closure body retaining assembly. In further details thereof, it can be provided that the fastening means for the fastening stone extends through respective longitudinal holes formed in each of the U-forming legs of the U-shaped closure body retaining assembly and that the closure body retaining assembly is displaceable relative to the fastening stone which is secured to the vehicle via the fastening means.

It is further provided that the open ends of the U-forming legs of the U-shaped closure body retaining assembly are secured to the closure body and the spring is disposed in the space between the fastening stone and the closed ends of the closure body retaining assembly and is supported thereagainst, whereby, for this purpose, the fastening stone comprises a shoulder, extending in the direction of the closed sides of the closure body retaining assembly, for guiding the spring.

In accordance with one embodiment of the present invention, to configure the contact, a switch element is provided which is mounted on the closure body retaining assembly and disposed in its closed position due to its contact against the fastening stone in the home position of the closure body, whereby the switch is lifted away from the fastening stone in connection with movement of the closure body retaining assembly relative to the fastening stone and thereby emits a signal indicating its movement out of contact.

In an alternative embodiment of the present invention embodying the concept of the closure body retaining assembly, with the closure body mounted thereon, being movable relative to the vehicle-secured anchor, it is provided, in one configuration, that the closed end of the closure body retaining assembly is seated in a fastening opening of the anchor piece and the free ends of the U-forming legs of the closure body retaining assembly are connected with the closure body, whereby the spring, which is supported, on the one end thereof, against the closed end of the closure body retaining assembly and, on the other end thereof, against the opposed edge of the fastening opening, is mounted between the U-forming legs of the closure body retaining assembly.

In this regard, it can be seen that the anchor piece comprises a shoulder extending outwardly therefrom in the direction of the closure body which engages, in the home position of the closure body retaining assembly, a switch element mounted on the closure body, which itself is supported by the closure body retaining assembly, the shoulder lifting the switch elements away from one another upon movement of the closure body retaining assembly with the thereon supported closure body relative to the anchor piece and thereby effecting the emission of a signal.

A useful purpose can be served if several compression springs are provided which extend in the displacement plane of the closure body and the closure body retaining assembly.

It can be provided, to stabilize the securement arrangement, that the closure body retaining assembly comprises tongues on its closed end extending axially outwardly, the tongues enclosing the anchor piece therebetween and acting to guide the anchor piece.

In a further embodiment of the present invention, it can be provided that only the closure body retaining assembly is movable relative to the closure body retaining assembly, which itself is a vehicle-secured component and, in this connection, that the contact is configured, on the one side, on the anchor piece and, on the other side, on the switch elements mounted on the closure body.

In this further embodiment, it can be provided that the closed end of the closure body retaining assembly is seated in a fastening opening of the anchor piece and the free ends of the U-forming legs of the closure body retaining assembly are connected with the closure body, whereby the spring, which is supported, on the one end thereof, against the closed end of the closure body retaining assembly and, on the other end thereof, against the opposed edge of the fastening opening, is mounted between the U-forming legs of the closure body retaining assembly and whereby the movement of closure body relative to the closure body retaining assembly is made possible by the guided movement of a fastening means, which extends through the U-forming legs of the closure body retaining assembly and is secured to the closure body, within longitudinal holes formed in the U-forming legs.

Preferably, in the just-described further embodiment, the spring is configured as a tension spring, whereby the tension spring is seated, on one end thereof, on the closure body and, on the other end thereof, on a tongue extending out of one of the U-forming legs of the closure body retaining assembly and bent inwardly between the U-forming legs.

To stabilize the securement arrangement, it can be provided that the tongue encloses the end of the anchor piece which extends over the fastening opening of the anchor piece and into the interior space of the closure body retaining assembly.

In view of the connection between the closure body and the closure body retaining assembly, it can be provided that the longitudinal holes formed in both U-forming legs of the closure body retaining assembly comprise different transverse extents and that the fastening means comprises a correspondingly stepped transverse section corresponding to the transverse extents of both longitudinal holes. In accordance with further details thereof, the respective U-forming leg of the closure body retaining assembly having the longitudinal hole with the smaller transverse extent can be disposed on the stepped transverse section of the fastening means and can be guided along the stepped transverse section of the fastening means during displacement of the closure body relative to the closure body retaining assembly.

To provide for the realization of the contact, it can be provided that the closure body retaining assembly comprises a shoulder functioning as a switch element and which extends outwardly from the closure body retaining assembly in the direction of the closure body, the shoulder switch element engaging, in the home position of the closure body, a switch element mounted on the housing of the closure body and the shoulder switch element lifting the switch elements away from one another upon movement of the closure body relative to the closure body retaining assembly and thereby effecting the emission of a signal.

BRIEF DESCRIPTION OF THE DRAWINGS

FIG. 7 is a sectional view of the further embodiment of the present invention shown in FIG. 6.

DETAILED DESCRIPTION OF THE PREFERRED EMBODIMENTS

Figure 1:
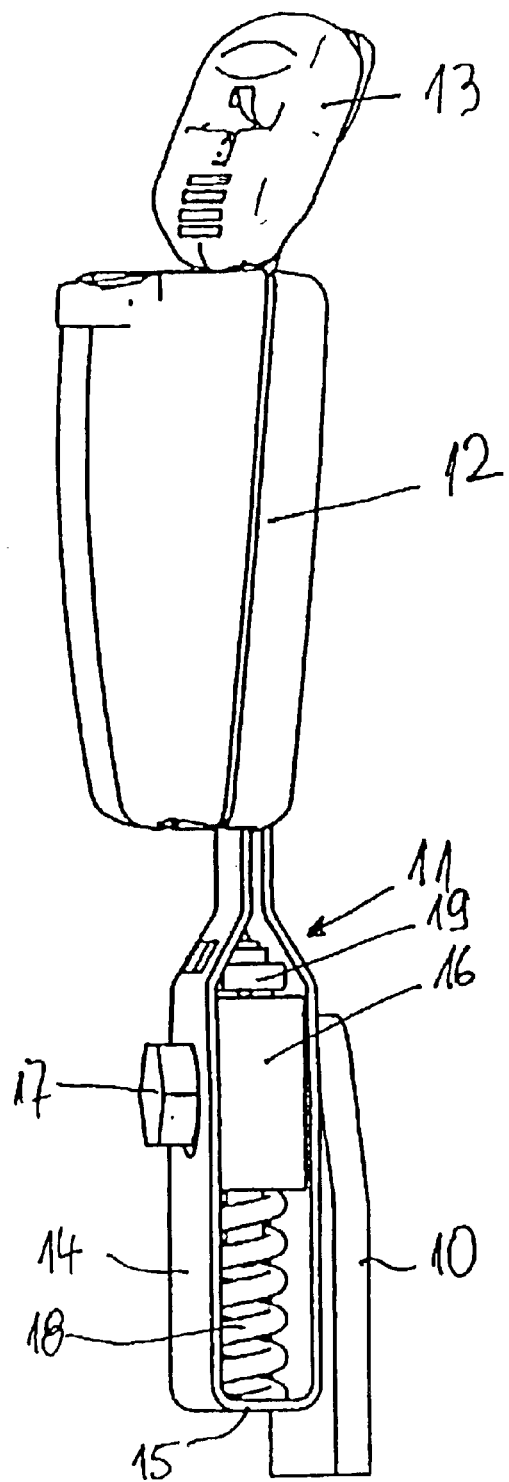
FIG. 1 is a perspective view of one embodiment of the present invention comprising a closure body with a securement arrangement.

The securement arrangement for a seat belt closure, which can be seen in FIG. 1, comprises an anchor piece 10, which is secured to the vehicle in a not-illustrated manner, to which a closure body retaining assembly 11 is mounted, the closure body retaining assembly 11 being, in turn, connected with a closure body 12, and the securement arrangement further comprising a closure tongue 13, to which a not-illustrated seat belt of a three-point seat belt is secured, which is inserted into the closure body 12.

The closure body retaining assembly 11 is U-shaped with two U-forming legs 14 and a closed end 15, whereby the free ends 21 of the U-forming legs 14 of the closure body retaining assembly 11 are connected with the closure body 12. A fastening stone 16 is disposed between the U-forming legs 14 of the closure body retaining assembly 11 by means of which the closure body retaining assembly 11 is secured to the anchor piece 10 via a fastening bolt 17 extending through the U-forming legs 14 and the fastening stone 16. Additionally, a compression spring 18 is disposed between the U-forming legs 14 of the closure body retaining assembly 11 and is secured, on one side, to the fastening stone 16 and, on the other side, to the closed end 15 of the closure body retaining assembly 11, the compression spring 18 biasing the closure body retaining assembly 11 and, thus, as well, the closure body 12, into the home position toward the left as shown in FIG. 1 in which the fastening stone 16 is in a disposition against a switch element 19 mounted on the closure body retaining assembly 11.

Figure 2:
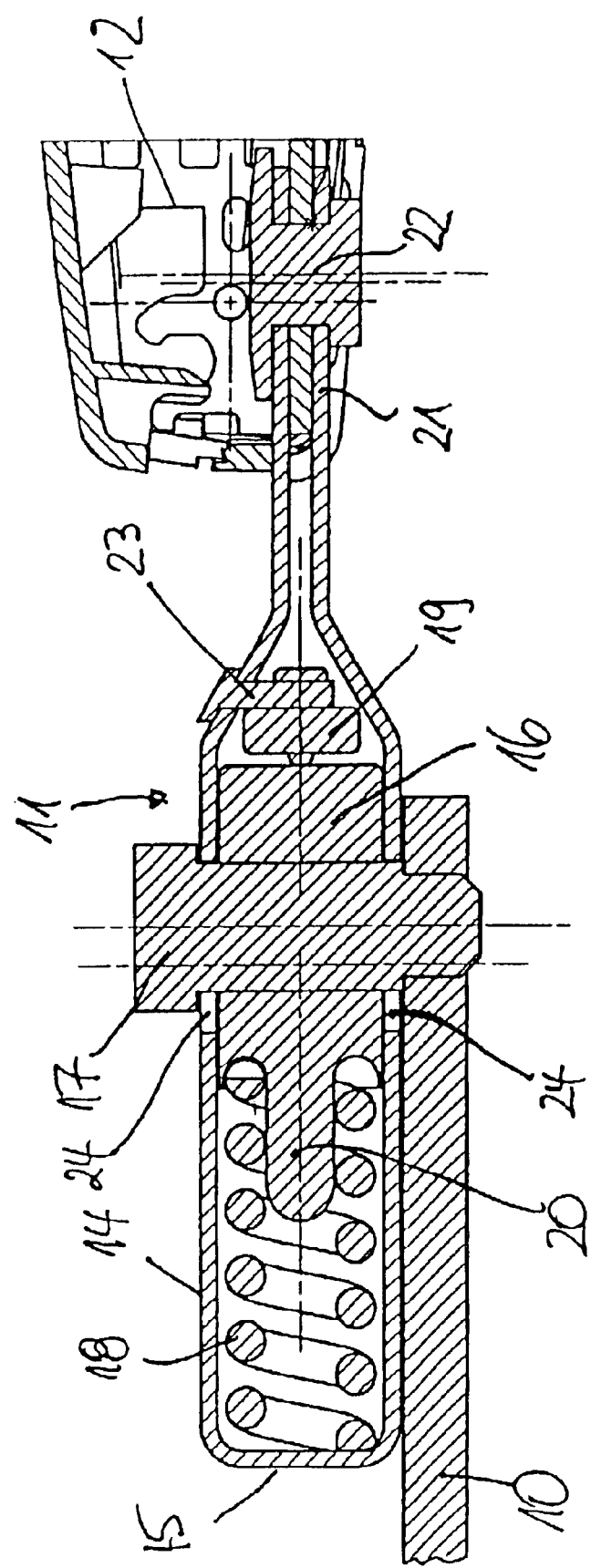
FIG. 2 is a sectional view of a portion of the one embodiment of the present invention shown in FIG. 1.

FIG. 2 shows features of the afore-described securement arrangement in more detail, including, especially, the feature that the fastening stone 16 comprises a shoulder 20 for guiding of the compression spring 18. It can be further seen that a retainer 23 is mounted on the closure body retaining assembly 11 for the switch element 19 and, additionally, that a fastening bolt 22 is provided by means of which the closure body 12 is mounted to the ends 21 of the U-forming legs 14 of the closure body retaining assembly 11. It can be further seen in FIG. 2 as well as in FIG. 3 that longitudinal holes 24 are provided in the U-forming legs 14 of the closure body retaining assembly 11 which have the fastening bolt 17 extending therethrough, so that the closure body retaining assembly 11, in connection with overcoming the bias exerted thereagainst by the compression spring 18, is displaceable toward the right as viewed in the figures of the drawings within the bounds of the maneuver or free play room provided by the longitudinal holes 24.

Figure 3:
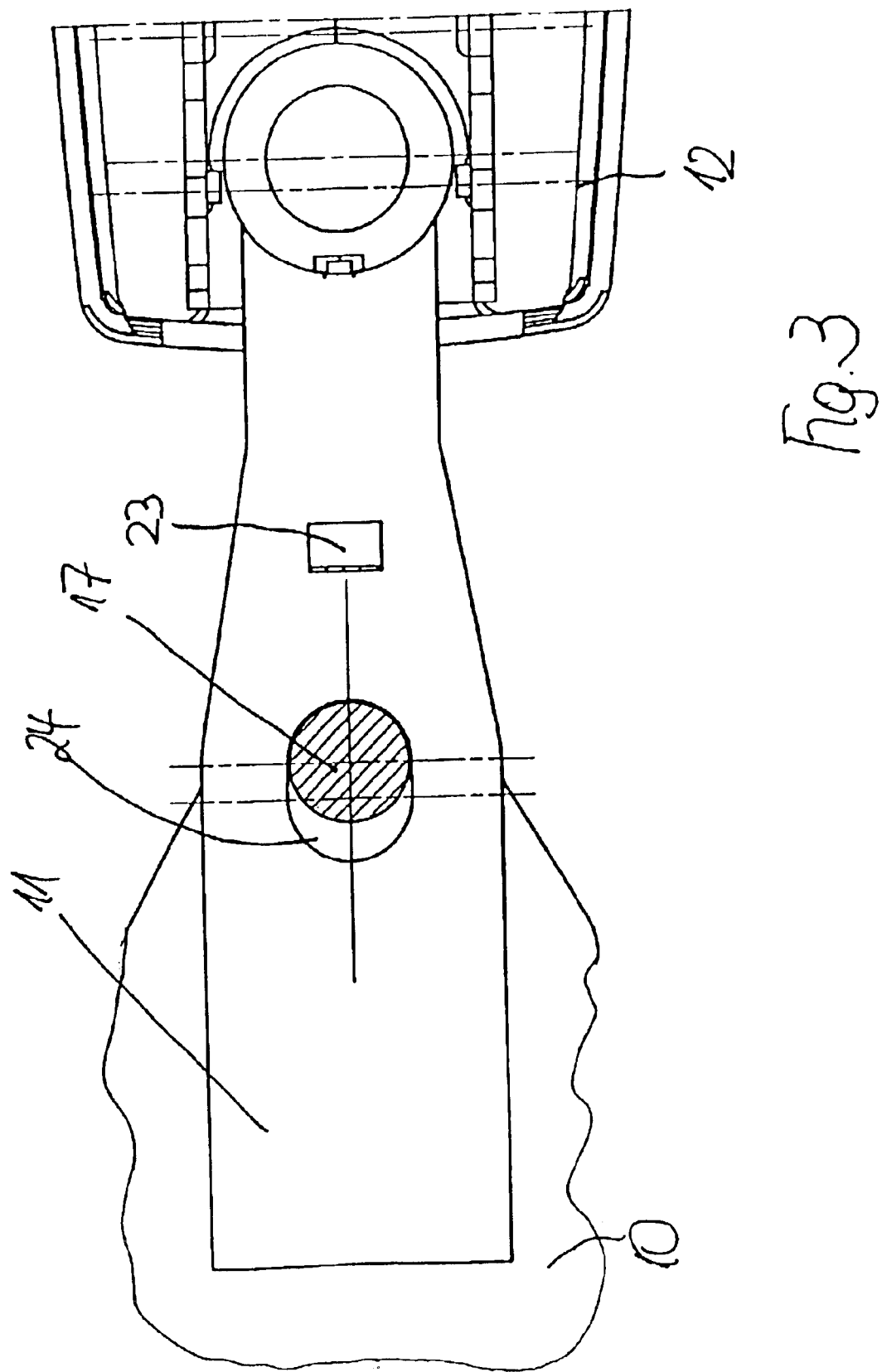
FIG. 3 is a sectional view of a portion of the one embodiment of the present invention shown in FIG. 1.

In connection with a locked-together seat belt, so long as the tension imposed on the seat belt due to the loading thereof does not overcome the predetermined bias of the compression spring 18, the arrangement of the closure body 12, the closure body retaining assembly 11, and the anchor piece 10 shown in FIGS. 1–3 remains as illustrated in which the switch element 19 secured to the closure body retaining assembly 11 is, via the biasing of the compression spring 18, maintained in a disposition against the fastening stone 16. In the event that the predetermined biasing force of the compression spring 18 is overcome, the closure body 12 is displaced toward the right, in that the longitudinal holes 24 in the U-forming legs 14 permit a displacement relative to the fixedly secured fastening bolt 17, in the context of which the switch element 19 is lifted away from the fastening stone 16 and is thereby actuated. An electrical signal is transmitted, as a consequence of the switch actuation, to a control device mounted on the vehicle at which it is decided whether a dedicated airbag device is to be deployed or not.

Figure 4:
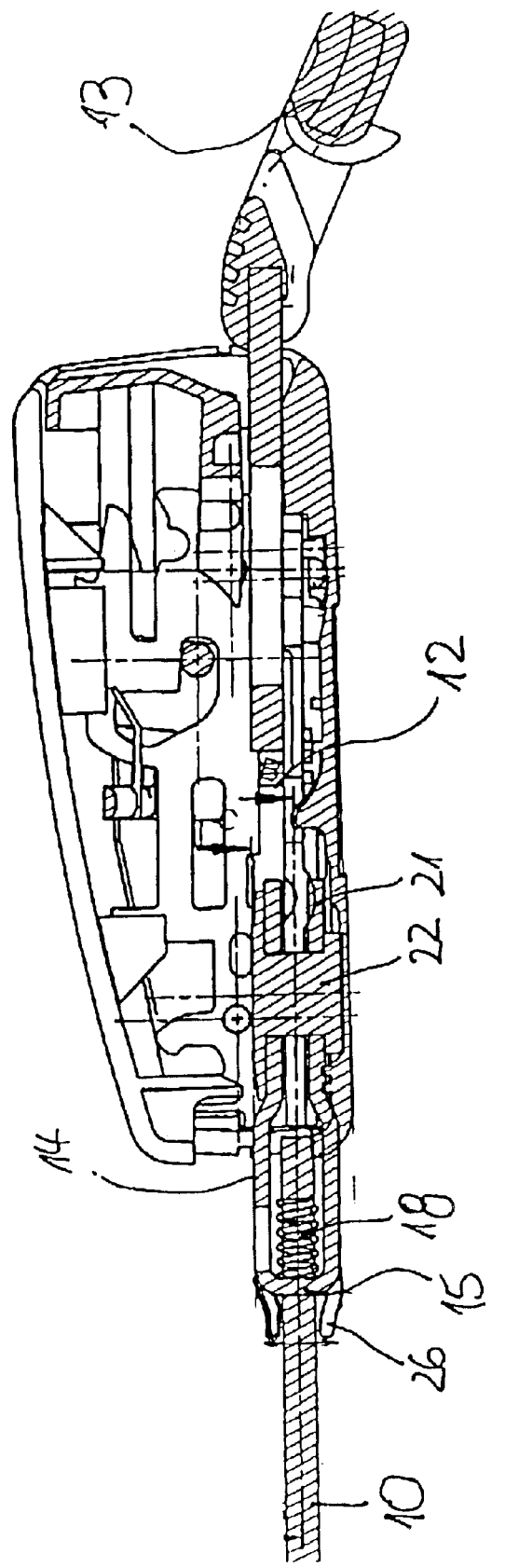
FIG. 4 is a sectional view of the closure body with a securement arrangement of an additional embodiment of the present invention.
Figure 5:
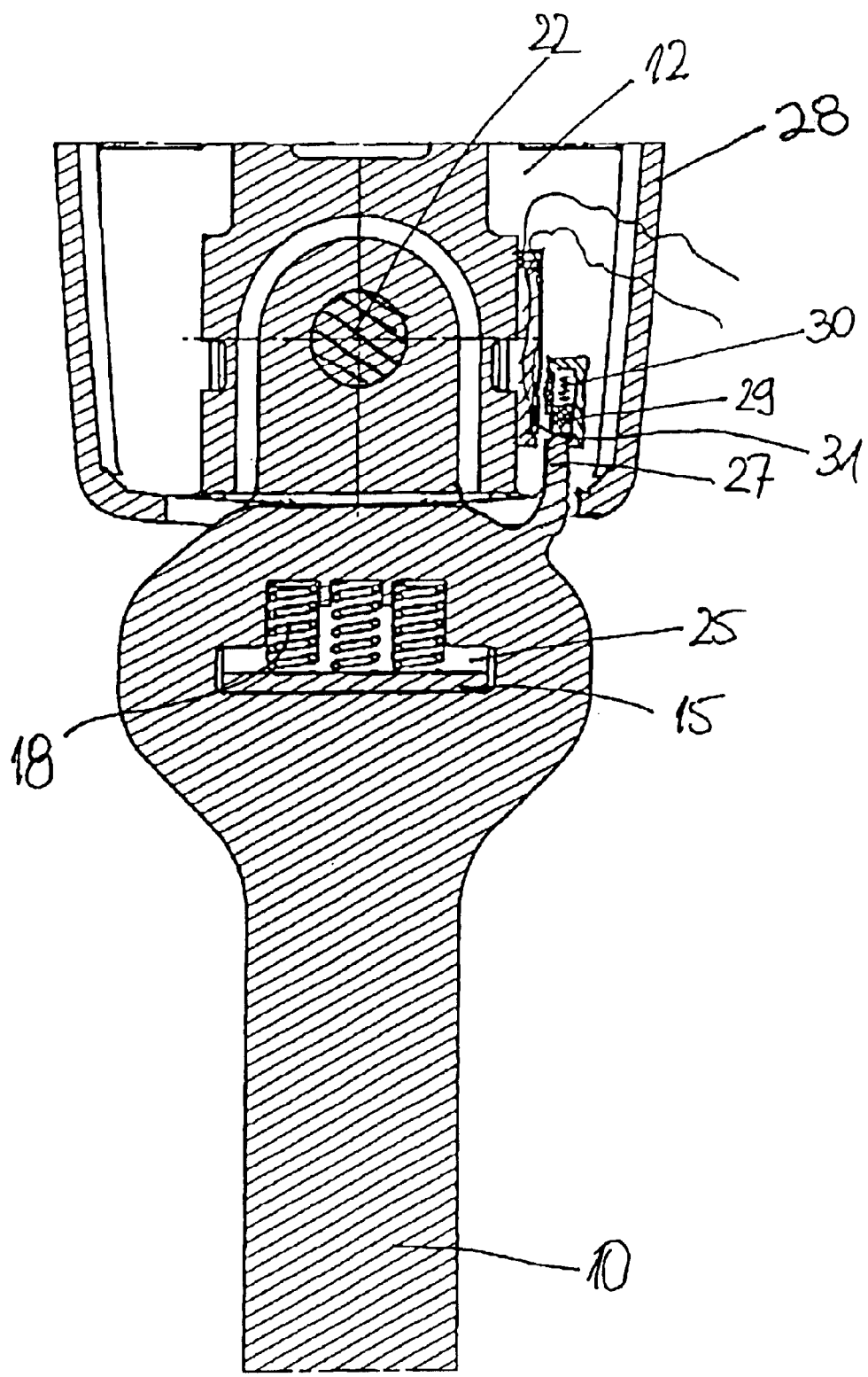
FIG. 5 is a sectional view of a portion of the additional embodiment of the present invention shown in FIG. 4.

The additional embodiment shown in FIGS. 4 and 5 operates according to the same operating principle as the embodiment shown in FIGS. 1–3, whereby, in a modification of the embodiment shown in FIGS. 1–3, the closed end 15 of the U-shaped closure body retaining assembly 11 extends into a fastening opening 25 formed in an end of the anchor piece 10. The compression spring 18, which is again likewise provided, is supported against the closed end 15 of the closure body retaining assembly 11 and its other end is in engagement with the opposing edge of the fastening opening 25 of the anchor piece 10. As can be seen in FIG. 5, three compression springs 18 arranged adjacent one another provide better stabilization of the connection between the closure body retaining assembly 11 and the anchor piece 10. To likewise promote such stabilization, tongues 26 extend axially outwardly of the closed end 15 of the closure body retaining assembly which enclose therebetween the anchor piece 10 and thus act as stabilizing guides for the anchor piece 10.

FIG. 5 shows closer details of the configuration of the contact. Thus, a shoulder 27 is provided on the anchor piece 10 extending in the direction toward the closure body 12 into the housing 28 of the closure body 12, the shoulder being disposed against a permanent magnet 29 mounted on the closure body 12 which is biased via a spring 30 toward the shoulder 27 of the anchor piece. A Hall effect switch 31 is arranged relative to the permanent magnet 29 such that the movement of the permanent magnet 29 relative to the Hall effect switch 31 effects the emission of a signal. If, in connection with such movement, the closure body 12 has been displaced from its position as described with respect to FIGS. 1–2 toward the right against the biasing force of the compression spring 18, the shoulder 27 on the anchor piece 10 lifts away from the permanent magnet 29, which has been displaced by the spring 30. This displacement is sensed by the Hall effect switch 31.

Figure 6:
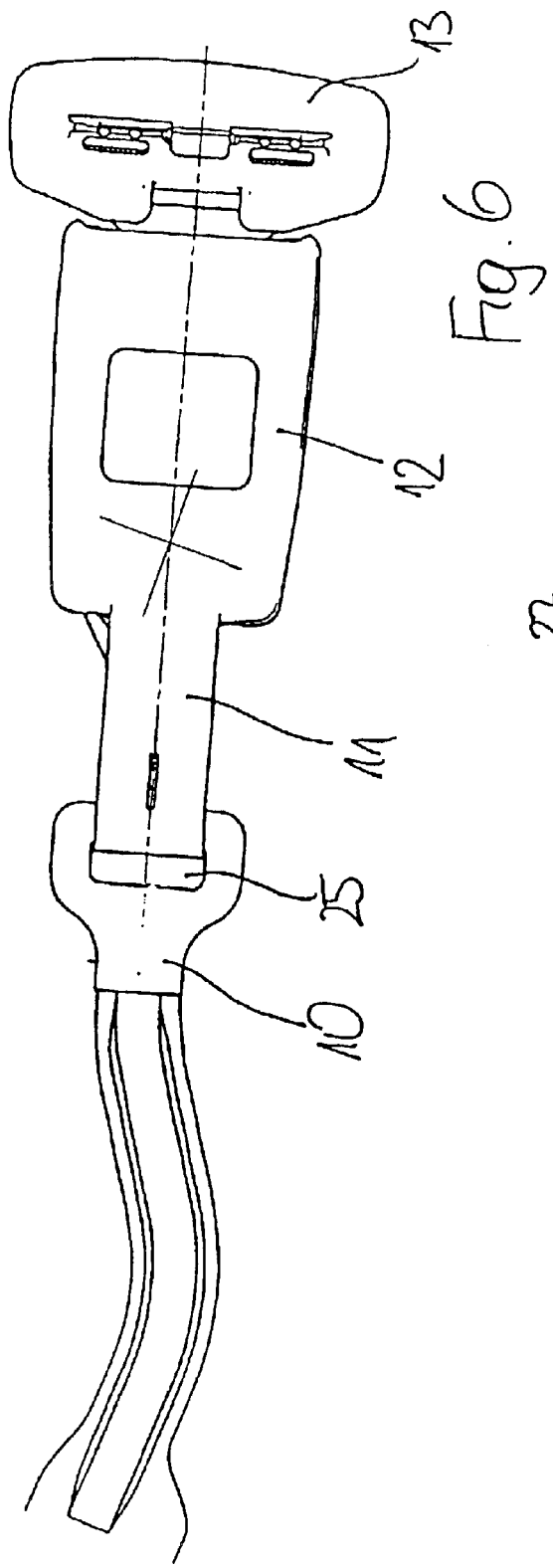
FIG. 6 is a plan view of the closure body with a securement arrangement of a further embodiment of the present invention.
Figure 8:
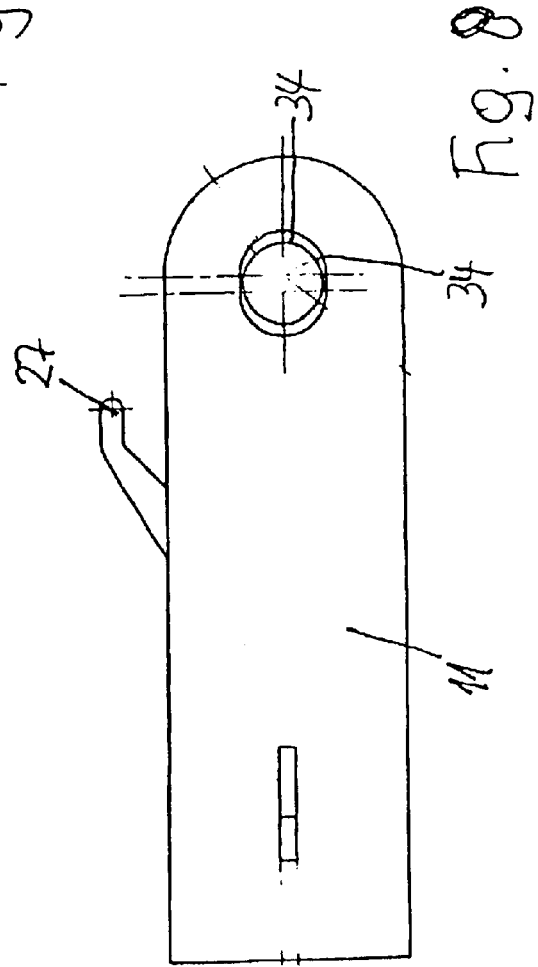
FIG. 8 is an enlarged plan view showing individual details of the closure body retaining assembly of the further embodiment of the present invention shown in FIGS. 6 and 7.

The further embodiment shown in FIGS. 6–8 is distinguished from the two heretofore described embodiments in that solely the closure body 12 is moveably mounted relative to the closure body retaining assembly 11. The closure body retaining assembly 11, which, as before, is configured with U-forming legs 14, corresponds to that shown in the embodiment described with respect to FIGS. 4 and 5 with its closed end 15 hooked into the fastening opening 25 of the anchor piece 10. A tongue 32 extends out of one of the U-forming legs 14 of the closure body retaining assembly 11 and is bent inwardly between the U-forming legs 14 in a manner such that the tongue encloses the end of the anchor piece which extends over the fastening opening 15 of the anchor piece 10; this tongue 32 simultaneously serves as a hook for securing the end of a tension spring 33 whose opposing end is secured to the closure body 12.

The displacement of the closure body 12 relative to the closure body retaining assembly 11 is made possible by the provision of longitudinal holes 34 in the ends 21 of the U-forming legs 14 of the closure body retaining assembly 11 through which extend the fastening bolt 22, the longitudinal holes providing the required free movement space for the displacement of the closure body 12 relative to the closure body retaining assembly 11. In the event that the closure body is moved due to the load imposed thereon by the closure tongue 13 from its position shown in FIG. 7 to the right against the biasing force of the tension spring 33, the fastening bolt 22 mounted on the closure body 12 likewise moves to the right within the longitudinal holes 34. In the same manner as heretofore described, a switch element comprised of a permanent magnet 29, a spring 30, and a Hall effect switch 31 can be provided on the closure body 12 to emit signals corresponding to such a displacement, the shoulder 27 of the closure body retaining assembly 11, which extends in the direction of the closure body 12 into its housing 28, being in contact against the switch (FIG. 8); to this extent, the relationships with respect to the release of contact operate in the same manner as those described with respect to the additional embodiment described with respect to FIGS. 4 and 5.

To provide for better guiding of the closure body 12 on the closure body retaining assembly 11, the longitudinal holes 34 in both U-forming legs 14 of the closure body retaining assembly 11 comprise different transverse extents, whereby the fastening bolt 22 comprises a correspondingly stepped transverse section corresponding to the transverse extents of both longitudinal holes 34. In this manner, a step 35 is configured on the fastening bolt 22 on which is disposed the upper U-forming leg 14 having, as viewed in the illustration shown in FIG. 7, the longitudinal hole 34 with the smaller transverse extent, whereby the stepped transverse section 35 of the fastening means guides the upper U-forming leg 14 during displacement of the closure body 12 relative to the closure body retaining assembly 11.

The specification incorporates by reference the disclosure of German priority document 101 63 917.1 filed Dec. 22, 2001.

The present invention is, of course, in no way restricted to the specific disclosure of the specification and drawings, but also encompasses any modifications within the scope of the appended claims.

What is claimed is:

1. A securement arrangement for a seat belt closure of a three-point seat belt system in a vehicle, comprising:
   an anchor piece secured to the vehicle;
   a closure body;
   a generally U-shaped closure body retaining assembly for mounting the closure body on the anchor piece, the closure body retaining assembly having a pair of U-forming legs;
   a biasing means for biasing the closure body into its home position, the biasing means being disposed between the pair of U-forming legs of the closure body retaining assembly; and
   a switch element for emitting a signal to be processed by an onboard signal processing unit, the closure body being displaceable relative to the closure body retaining assembly against the biasing force of the biasing means and the switch element being disposed such that, if the closure body, due to the application thereto of a load imposed by the seat belt, is displaced so as to overcome the biasing force of the biasing means, the switch element correspondingly moves out of contact and emits a signal in response to its movement out of contact.

2. A securement arrangement according to claim 1, wherein the anchor piece is secured to a component fixedly secured to the vehicle.

3. A securement arrangement according to claim 1, wherein the closure body is moveable relative to the closure body retaining assembly in opposition to the vehicle-secured anchor and contact is formed by, on the one side, the vehicle-secured anchor and, on the other side, by the switch element mounted on the closure body retaining assembly.

4. A securement arrangement according to claim 1 and further comprising a fastening stone disposed between the U-forming legs of the closure body retaining assembly and a fastening means extending through the fastening stone for securing the fastening stone in its disposition between the U-forming legs of the closure body retaining assembly, and the biasing means includes a spring biasing the closure body retaining assembly against the fastening stone.

5. A securement arrangement according to claim 4, wherein the fastening means extends through respective longitudinal holes formed in each of the U-forming legs of the U-shaped closure body retaining assembly for securing the fastening stone relative thereto, and the closure body retaining assembly is displaceable relative to the fastening stone.

6. A securement arrangement according to claim 4, wherein the closure body retaining assembly includes a closed end and the U-forming legs of the U-shaped closure body retaining assembly include open ends which are secured to the closure body and the spring is disposed in the space intermediate the fastening stone and the closed end of the closure body retaining assembly and is supported against the fastening stone and the closed end of the closure body retaining assembly.

7. A securement arrangement according to claim 6, wherein the fastening stone includes a shoulder extending in the direction of the closed side of the closure body retaining assembly, the shoulder operating as a guide for the spring disposed thereagainst.

8. A securement arrangement according to claim 4, wherein the switch element is disposed on the closure body retaining assembly and is in its closed condition when disposed against the fastening stone in the home position of the closure body, the switch element being lifted off of the fastening stone in response to displacement of the closure body retaining assembly relative to the fastening stone and emitting a signal in response to such lifting off movement.

9. A securement arrangement according to claim 1, wherein the closure body retaining assembly has a closed end which extends into a fastening opening of the anchor piece, the U-forming legs of the closure body retaining assembly include respective free ends connected with the closure body, and the biasing means includes a spring disposed between the U-forming legs of the closure body retaining assembly with one end thereof supported against the closed end of the closure body retaining assembly and the other end thereof supported against an edge of the fastening opening of the anchor piece.

10. A securement arrangement according to claim 9, wherein the anchor piece comprises a shoulder extending sideways therefrom in the direction toward the closure body, the switch element is mounted on the closure body which itself is supported by the closure body retaining assembly, and the switch element being engaged by the shoulder of the anchor piece and movement of the closure body retaining assembly, with the closure body supported thereon, relative to the anchor piece, effecting movement of the shoulder and the switch element out of contact with one another with the attendant emission of a signal.

11. A securement arrangement according to claim 9, wherein the biasing means includes a plurality of compression springs disposed in the displacement plane of the closure body and the closure body retaining assembly.

12. A securement arrangement according to claim 9, wherein the closure body retaining assembly includes a pair of tongues extending axially outwardly from the closed end of the closure body retaining assembly, the tongues enclosing the anchor piece therebetween and operating to guide the anchor piece.

13. A securement arrangement according to claim 1, wherein the closure body is moveable relative to the closure body retaining assembly in opposition to the vehicle-secured anchor and contact is formed by, on the one side, the vehicle-secured anchor and, on the other side, by the switch element mounted on the closure body.

14. A securement arrangement according to claim 13, wherein the closure body retaining assembly includes a closed end which extends into a fastening opening of the anchor piece and the U-forming legs of the closure body retaining assembly include free ends which are connected with the closure body, and a spring is disposed between the U-forming legs of the closure body retaining assembly and supported on one end against the closed end of the closure body retaining assembly and on its opposite end against the closure body.

15. A securement arrangement according to claim 14, wherein the U-forming legs of the closure body retaining assembly include longitudinal holes and a fastening means extends through the longitudinal holes and is secured to the closure body such that the movement of the closure body relative to the closure body retaining assembly is guided by the fastening means.

16. A securement arrangement according to claim 14, wherein the spring is configured as a tension spring.

17. A securement arrangement according to claim 16, wherein the tension spring is, on one end thereof, connected to the closure body and, at its other end, is connected to a tongue extending from one of the U-forming legs of the closure body retaining assembly and bent into the interior space of the closure body retaining assembly.

18. A securement arrangement according to claim 17, wherein the tongue encloses the end of the anchor piece which extends over the fastening opening of the anchor piece and extends into the interior space of the closure body retaining assembly U.

19. A securement arrangement according to claim 15, wherein the longitudinal holes formed in the U-forming legs of the closure body retaining assembly have differing transverse extents and the fastening means comprise a stepped transverse section that corresponds to the transverse extents of both longitudinal holes.

20. A securement arrangement according to claim 19, wherein the respective U-forming leg of the closure body retaining assembly having the longitudinal hole with the smaller transverse extent is disposed on the stepped transverse section of the fastening means and is guided along the step of the fastening means during displacement of the closure body relative to the closure body retaining assembly.

21. A securement arrangement according to claim 14, wherein the closure body retaining assembly includes a shoulder extending sideways therefrom in the direction toward the closure body and configured as a switch element which, in the home position of the closure body, engages a switch element, and, upon relative displacement of the closure body relative to the closure body retaining assembly, lifts the switch elements from one another and thereby effects the emission of a signal.

* * * * *